United States Patent [19]

Bennet

[11] 4,412,386

[45] Nov. 1, 1983

[54] COMPASS

[75] Inventor: John G. Bennet, Macomb, Mich.

[73] Assignee: The United States of America as represented by the Army, Washington, D.C.

[21] Appl. No.: 289,939

[22] Filed: Aug. 4, 1981

[51] Int. Cl.³ .............................................. G01C 17/34
[52] U.S. Cl. .................................................... 33/268
[58] Field of Search .................. 116/DIG. 5; 33/268, 33/269, 270

[56] References Cited

U.S. PATENT DOCUMENTS

| 686,127 | 11/1901 | Potter | 33/269 |
| 2,612,693 | 10/1952 | Schonstedt | 33/268 |
| 3,015,249 | 1/1962 | Taylor | 33/268 X |

Primary Examiner—Harry N. Haroian

Attorney, Agent, or Firm—Peter A. Taucher; John E. McRae; Robert P. Gibson

[57] ABSTRACT

A non-magnetic compass for use in a moving military land vehicle, comprising a rapidly rotating platform having a north star-seeking columnar element that carries a sun-seeking telescope. Fibre optic bundles transmit sun rays from the telescope to a selected light sensor in a stationary circular sensor system concentric with the platform rotational axis. During one instant during each rotating cycle of the platform the telescope will sight the sun while the columnar element is simultaneously oriented to the north star; light rays are transmitted from the scope to a north-oriented sensor in the sensor system. The columnar element and telescope are periodically adjusted to take into account the geographical location of the vehicle and time of year.

6 Claims, 4 Drawing Figures

COMPASS

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to a compass that can be used in military vehicles to designate true north while the vehicle is changing directions. A special aim is to provide a compass that is unaffected by large iron masses in the hulls or turrets of military vehicles.

I have designed the compass to include a platform that rotates in a horizontal plane at a relatively high rotational speed, e.g. 100 revolutions per minute. A frame structure is swingably mounted on the platform for upward angulation to a setting that will establish a north star sight line when the platform is at some point in its cycle of revolution. An elongated columnar element is oriented on the north star sight line for slow rotational motion at a speed of one twenty fourth revolution per hour, i.e. one complete revolution per day. The columnar element provides a support surface for a telescope that is designed to intermittently sight the sun while the sun is passing overhead during the course of each day. Periodically adjustments are made in the angle between the columnar element and telescope sight line, whereby the telescope is ensured of sighting the sun during all seasons, e.g. summer, winter, etc.

When the instrument is in use two motions take place. The platform rotates at a high speed in a horizontal plane; for an instant during each revolution of the platform the columnar element is aligned with the north star. The slow rotation of the columnar element enables the telescope to have a potential sight line on the sun at one point during each revolution of the platform. If the columnar element and telescope are properly adjusted the telescope will sight the sun at the precise instant when the columnar element is aligned with the north star. A flicker of light in the telescope will indirectly indicate a north-seeking orientation of the columnar element.

The compass contains a circular array of fibre optic bundles optically connected to the telescope. A flickering light output at any one of the fibre optic bundles will indicate a north-seeking attitude of the columnar element. Frequency of the light output is the same as the rotational speed of the platform, e.g. 100 cycles per minute, sufficient for human viewing purposes. The platform rotational speed is not critical; higher or lower speeds can be used.

The rotating platform is an important feature of the invention since it enables the compass to operate whatever the direction being taken by the moving vehicle. The rapidly rotating platform causes the columnar element to have a north star-seeking orientation at some point during each revolution of the platform irrespective of which direction the vehicle might then be taking. The instant at which the columnar element is in the north-seeking orientation is not precisely known. However that is not of any great importance since the rapidly rotating platform enables the columnar element to achieve the desired orientation at a high frequency, e.g. 100 time per minute in the example system.

My invention is particularly intended for use in military vehicles where the large iron mass would adversely affect the performance of magnetic compass systems. I believe that my compass will be cheaper to build than gyroscopic compass systems.

THE DRAWINGS

Figure 1:
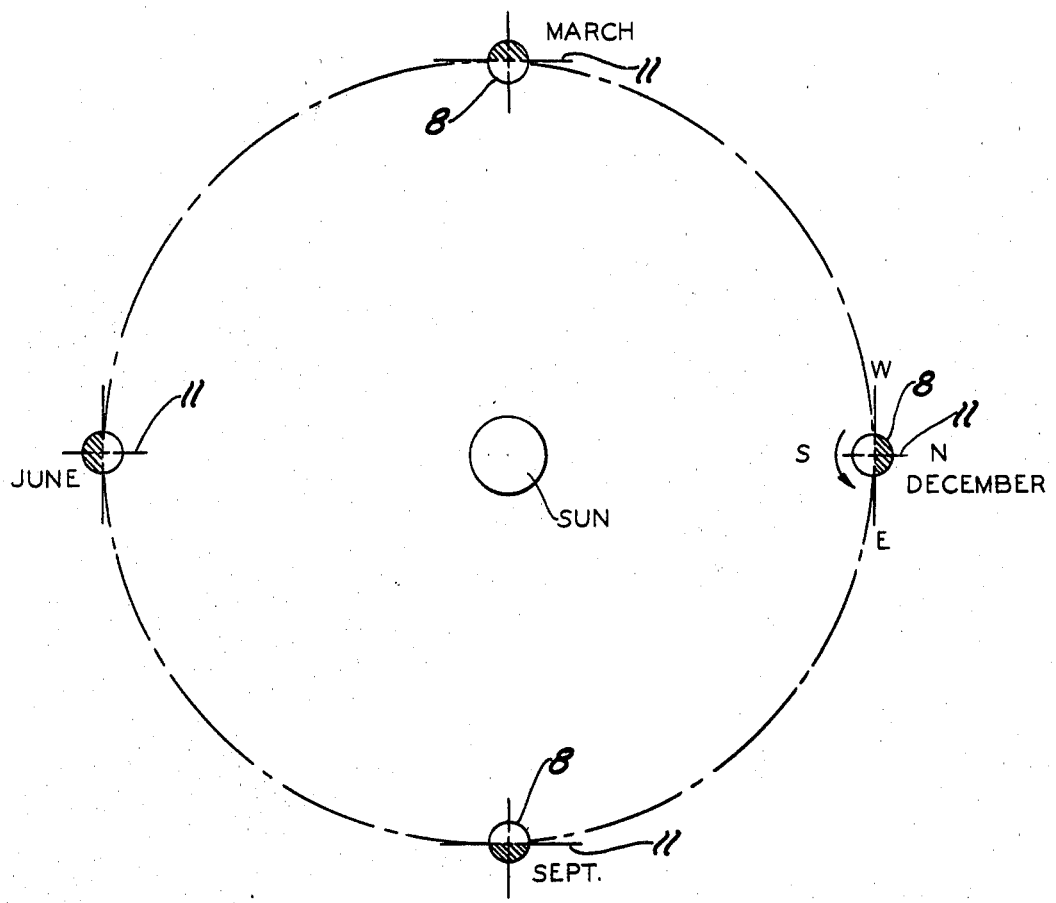
FIG. 1 is a schematic chart showing earth motion around the sun.

My compass indicates a northern direction by tracking the sun. Adjustments are made in compass components to take into account variations in the sun north/south pole axis relationship due to latitude and time of year. To better explain this relationship I show in FIGS. 1 and 2 how our earth 8 orbits around the sun once per year and around the north/south pole axis 11 once every 24 hours. The earth rotational axis is continually tilted at about 23° to the earth orbital plane 10 around the sun.

Figure 2:
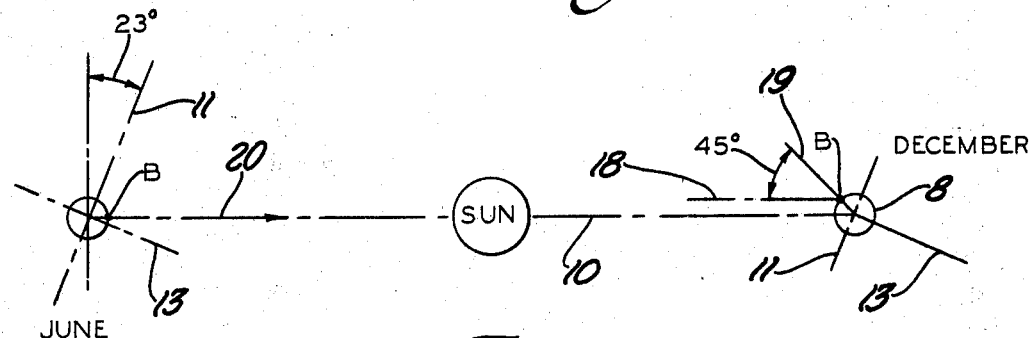
FIG. 2 is a side view of the FIG. 1 system.

FIG. 2 illustrates generally how the sun-sight plane from any point on the earth surface changes throughout the year, i.e. from December to June. At latitude B located north of equator 13 the sun-sight plane 18 has an angle of about forty-five degrees to vertical line 19 during the month of December. In June the sun-sight plane 20 from latitude B is essentially zero degrees to the vertical. The sun-tracking mechanism in my compass includes an adjustment to compensate for monthly changes in elevation of the sun-sight plane.

Figure 3:
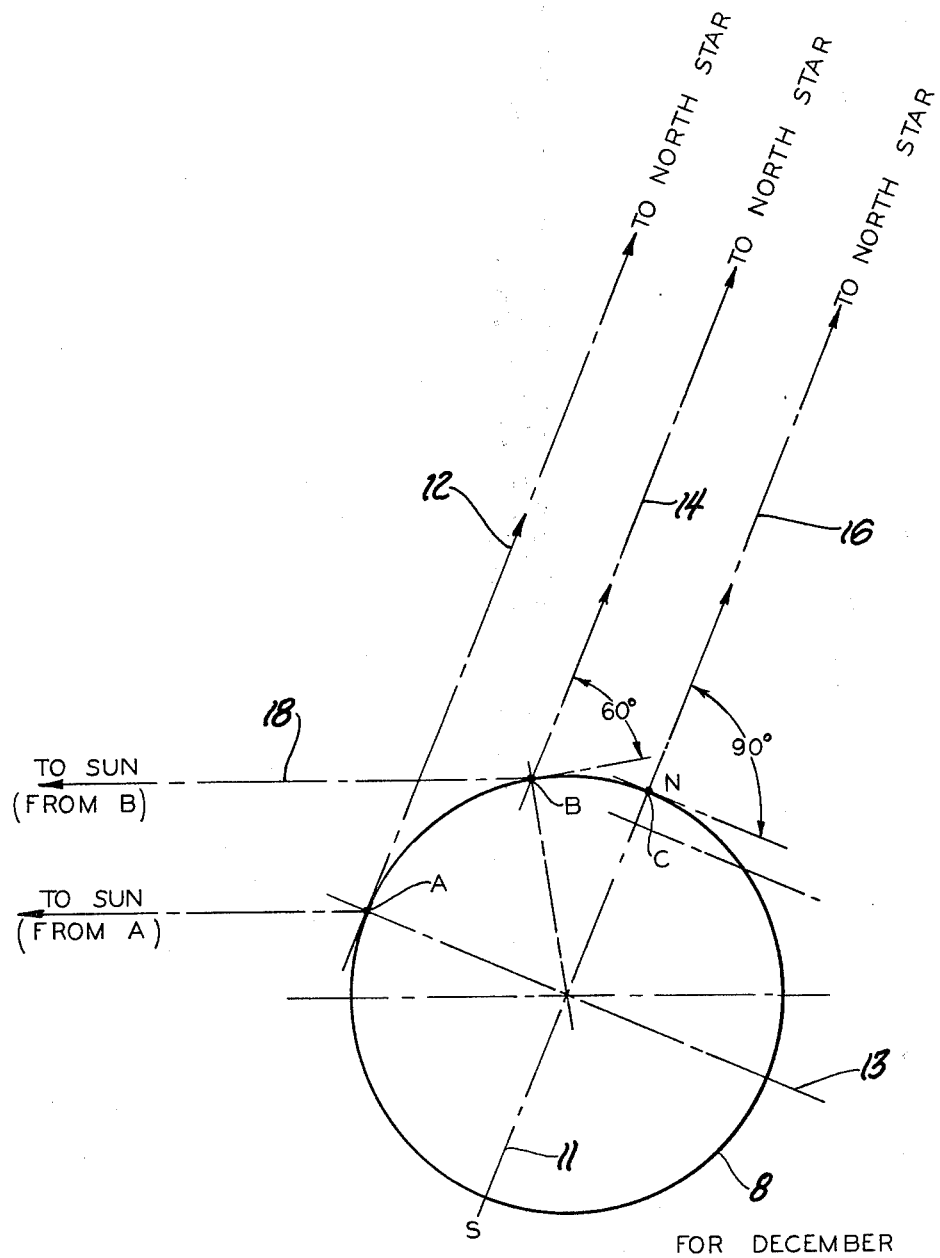
FIG. 3 is an enlarged fragmentary view of a portion of the system shown in FIG. 2.

FIG. 3 shows the earth magnified relative to FIG. 2. Sight lines to the north star are shown at 12, 14 and 16. At point A (zero degrees latitude) the north sight line 12 is generally horizontal (parallel to the earth surface); at point B (sixty degree latitude) the sight line 14 is angled upwardly at 60 degrees to the horizontal; at point C the north sight line 16 is 90° degrees, i.e. vertical. The sun-tracking mechanism in my compass is adjustable to take into account the different north-seeking angulations that occur at different latitudes on the earth surface.

Figure 4:
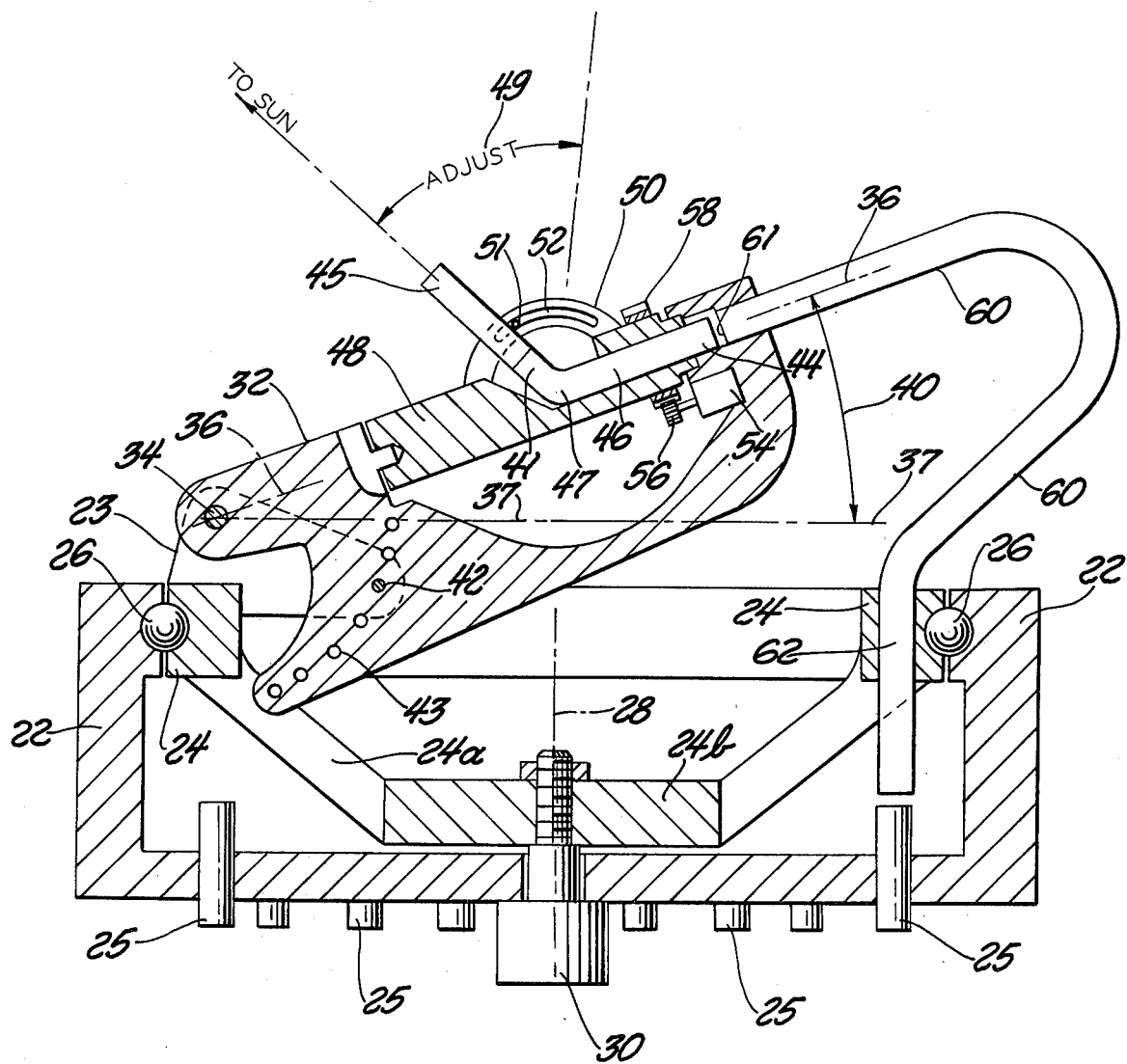
FIG. 4 depicts a compass structure embodying my invention.

The general features of my compass are shown in FIG. 4. The compass includes a base 22 that is intended to remain in a level condition within a military ground vehicle irrespective of changes in vehicle attitude due to rolling, pitching or turning. Gimbal systems, not shown, are provided to stabilize the position of base 22 in the vehicle. A platform 24 is disposed on base 22 by means of anti-friction bearings 26, whereby the platform is freely rotatable around central vertical axis 28. Base 22 can be mounted in the roof area of a military vehicle, either in the hull or the turret, so that military personnel within the vehicle can look upwardly to view certain fibre optic bundles or sensors 25 mounted in base 22. The optical bundles are arranged in a circular array around central axis 28 that represents the compass center. The compass is constructed so that the sun's rays are received by the compass optical system and transmitted to one of the fibre optic bundles 25 that happens at any one instant to be located directly north from central axis 28. The end face of the particular bundle 25 is illuminated or brightened, whereas the end faces on the other bundles 25 are dark; the illuminted bundle 25 indicates true north.

Platform 24 includes two or more struts 24a that connect the outer portion of the frame to the frame inner portion 24b. A motor 30 has its shaft connected to frame portion 24b for continually driving platform 24 around axis 28 at a relatively high rotational speed, e.g. 100 rev per minute. A frame 32 is swingably-adjustably connected at 34 to a bracket 23 on platform 24 for adjustment in the elevational plane, i.e. the plane of the paper in FIG. 4. The frame defines an imaginary north star sight line 36 that periodically points to the north star, once during each revolution of platform 24 around axis 28. Frame 32 is adjustable around pivot 34 to vary the angle 40 between north star sight line 36 and horizontal reference plane 37 passing through pivot 34. Angle 40 is adjusted or changed in accordance with the latitude in which the compass is used. For example, at latitude B in FIG. 3 frame 32 would have an elevational angle 40 that measures sixty degrees. At latitude A (the equator) angle 40 would be set at zero degrees. The frame 32 can be held at a desired angle 40 by means of a lock pin 42 extended through a selected frame hole 43 into a reference hole in bracket 23; other mechanisms for holding frame 32 in selected points of adjustment around pivot 34 axis can be designed.

Frame 32 carries a rotary column 48 that mounts a telescope 45 and an optical transmission element in the form of a flexible fiber optic bundle 46. Bundle 46 includes a light entrance section 41 affixed to telescope 45 and a light exit section 44 oriented along sight line 36 (the rotational axis of column 48). Telescope 45 is pivotably adjustable about a central transverse axis 47 through a range of adjustments 49. The telescope adjustment system includes a scale plate 50 affixed to column 48; telescope 45 carries a set screw 51 that extends through slot 52 in plate 50 to lock the scope in different settings within the range of settings designated by numeral 49. The scope is shown in its December setting; the setting at the other limit is for the month of June. Intermediate settings are used.

Column 48 is rotatable around its central axis 36 at a rate of one revolution per twenty-four hour period. The desired rotation can be achieved by a small motor 54 mounted on frame 32. The motor shaft carries a pinion gear 56 that meshes with a ring gear 58 carried by column 48. Frame 32 has an enlarged interior recess to accommodate telescope 45 when column 48 is rotated to an upside down position. Motors 54 and 30 are operated on a continuous basis to simultaneously rotate column 48 and platform 24.

As platform 24 rotates rapidly around central axis 28 the telescope 45 optical axis periodically aligns with the sun, causing a pulse of light to be directed through the scope and fibre optic bundle 46. The right end of frame 32 mounts a second fibre optic bundle 60 whose light entrance face 61 registers with bundle 46 throughout rotational motion of column 48. Bundle 60 has its other end 62 secured to platform 24 to direct light rays downwardly through one of a number of light sensor bundles 25 mounted in base 22; bundles 25 are arranged in a ring pattern around axis 28. Fibre optic bundle 60 has some unstressed free length intermediate its ends to accommodate adjusting motions of frame 32 around pivot 34. Instrument accuracy is partly a function of the number of fiber optic bundles 25 in base 22; the greater the number of bundles 25 the more precise is the north measurement.

Before the compass is put into use two adjustments must be made. Frame 32 is adjusted around axis 34 to a preselected elevational angle 40 representing the attitude of the instrument relative to the north star; angle 40 will vary in accordance with the earth latitude in which the compass is located. Also, telescope 45 is locked at a particular setting within adjustment range 49, in accordance with the particular time of the year in which the adjustment is made. Adjustment 49 represents potential change in sighting angle of the instrument relative to the sun throughout the year. The setting of frame 32 at a particular point within adjustment range 40, and the setting of telescope 45 at a particular point within adjustment range 49, are facilitated by the use of markings or gradations on frame 32 and scale plate 50. Such gradations eliminate the need for external tables.

With motors 30 and 54 in operation, the platform 24 rotates around axis 28 at a relatively high speed, e.g. 100 rev per minute. Also, column 48 rotates around axis 36 at a slower rate of one revolution per twenty-four hours. At one point in each revolution of platform 24 telescope 45 is aligned with the sun. Assuming correct adjustments at 40 and 49, the telescope will sight the sun at the same instant that columnar element 48 is in a north-seeking direction. The sun rays are transmitted through scope 45 into bundle 46, thence into fibre optic bundle 60 to one of the fixed optic elements 25. The observer views the array of bundles 25 from a point below base 22; the illuminated bundle 25 will be directly north from axis 28. Since platform 24 is rotating at a high rate of speed the north-indicating bundle 25 will be illuminated in pulse fashion (once every hundreth minute). The flickering illumination is sufficient to distinguish the north bundle 25 from other bundles.

Comparing FIGS. 4 and 3, sight line 36 corresponds to the north-seeking sight line 12, 14 or 16 when platform 24 is at a certain point in its rotation. The telescope 45 sight line corresponds to sight line 18 in FIG. 3. Once telescope 45 has been set to focus on the sun the motor 54 will cause the scope to be in its sun-tracking mode for an instant during each rotation of platform 24. The purpose for rapidly rotating platform 24 is to make the compass immune to changes in direction of the vehicle in which the compass is mounted. The vehicle can turn in every direction, but the compass will still illuminate the north-most fibre optic bundle 25 when platform 24 is rotated to a point at which telescope 45 captures the sun rays.

When the compass is used in a vehicle, base 22 should be mounted so that it is continually in a level attitude. A level attitude can be achieved with gyros and/or pendulum mounting devices, not shown. The main advantage of the compass is its immunity from the magnetic deviation forces associated with the large iron mass in a military tank.

I wish it to be understood that I do not desire to be limited to the exact details of construction shown and described for obvious modifications will occur to a person skilled in the art.

I claim:

1. A compass comprising a base; a platform mounted for rotation on the base; motor means for rotating the platform in a horizontal plane at a relatively high speed; a frame located in close proximity to the platform; a swingable connection between the platform and frame enabling the frame to have angular motion in the elevational direction; means holding the frame in selected positions of adjustment in the elevational direction, whereby the frame can establish a sight line with the north star at a particular point in the platform rotational cycle; a columnar element oriented on the frame so that its axis coincides with the north star sight line; means for slowly rotating the columnar element around its axis once per twenty four hour day; a telescope mounted on the columnar element; and means for adjusting the telescope so that its optical axis has a predetermined angle to the columnar element axis, the predetermined angle being such that when the columnar element is sighting the north star the telescope will be sighting the sun.

2. The compass of claim 1, and further comprising a circular array of light sensors arranged on the base on directional lines radiating from the platform rotational axis; and an optical transmission means extending between the output end of the telescope and a point on the platform that registers with the array of light sensors; said optical transmission means being oriented so that when the columnar element is located on the north star sight line the transmission means will illuminate a sensor indicative of the north star direction.

3. The compass of claim 2: said optical transmission means comprising a flexible fibre optic bundle having its opposite ends mounted respectively on the platform and frame.

4. The compass of claim 2 wherein the optical transmission means includes a second fibre optic bundle carried on the columnar element to direct sun rays from the telescope to the above-mentioned flexible bundle.

5. The compass of claim 1: the swingable connection between the frame and platform being located near a peripheral edge of the platform; the frame being disposed within the plan profile of the platform; the frame being internally recessed to permit passage of the telescope across the frame during the night hours.

6. The compass of claim 1: the telescope adjusting means being constructed so that the telescope is enabled to swing around a central axis (47) that substantially intersects the platform rotational axis.

* * * * *